(12) United States Patent
Goto et al.

(10) Patent No.: US 6,869,190 B2
(45) Date of Patent: Mar. 22, 2005

(54) PROJECTION DISPLAY DEVICE

(75) Inventors: Tooru Goto, Kumagaya (JP); Masahiro Muramatsu, Kumagaya (JP); Kenji Kamei, Kodama-gun (JP); Morio Ando, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/455,793

(22) Filed: Jun. 6, 2003

(65) Prior Publication Data

US 2004/0017549 A1 Jan. 29, 2004

(30) Foreign Application Priority Data

Jun. 7, 2002 (JP) ........................................ 2002-167155

(51) Int. Cl.[7] ........................ G03B 21/20; G03B 21/26; G03B 21/00
(52) U.S. Cl. .............................. 353/85; 353/94; 353/31
(58) Field of Search .......................... 353/122, 30–34, 353/85, 86, 69, 94; 349/5, 7–10

(56) References Cited

U.S. PATENT DOCUMENTS

| 5,031,078 | A | * | 7/1991 | Bornhorst ................... 362/552 |
| 5,632,545 | A | * | 5/1997 | Kikinis ........................ 353/31 |
| 6,309,072 | B1 | * | 10/2001 | Deter ........................... 353/31 |
| 6,547,400 | B1 | * | 4/2003 | Yokoyama ..................... 353/98 |
| 6,552,754 | B1 | * | 4/2003 | Song et al. .................. 348/750 |
| 6,612,703 | B2 | * | 9/2003 | Lowenthal et al. ........... 353/31 |
| 6,624,828 | B1 | * | 9/2003 | Dresevic et al. ............ 345/771 |
| 6,676,260 | B2 | * | 1/2004 | Cobb et al. .................. 353/31 |
| 2004/0027486 | A1 | * | 2/2004 | Fujiwara et al. ............ 348/557 |

FOREIGN PATENT DOCUMENTS

JP 7-222185 8/1996

* cited by examiner

Primary Examiner—Judy Nguyen
Assistant Examiner—Andrew Sever
(74) Attorney, Agent, or Firm—Pillsbury Winthrop LLP

(57) ABSTRACT

A projection display device comprises a plurality of light sources which produce different primary colors of light, a plurality of display units each of which is driven by a video signal corresponding to one of the primary colors, receives light from one of the light sources which produces light corresponding to the one of the primary colors, and outputs video image light modulated by the video signal, a projection unit which projects video image light output from the display units, and a light source control unit configured to control the amount of light produced by each of the light sources independently.

8 Claims, 3 Drawing Sheets

PROJECTION DISPLAY DEVICE

CROSS-REFERENCE TO RELATED APPLICATIONS

This application is based upon and claims the benefit of priority from the prior Japanese Patent Application No. 2002-167155, filed Jun. 7, 2002, the entire contents of which are incorporated herein by reference.

BACKGROUND OF THE INVENTION

1. Field of the Invention

The present invention relates to improvements in a projection display device which projects an optical image onto a screen for video display.

2. Description of the Related Art

In recent years, with the widespread use of information terminals for the home, such as personal computers, and the practical use of high-definition television, the demand has increased for displaying video images on a larger screen with higher brightness and resolution. To meet such a demand, the development of projection display devices, such as liquid crystal projectors, is accelerated at present.

A projection display device comprises: three light sources each corresponding to a respective one of a plurality of primary colors, for example, red (R), green (G) and blue (B); three liquid crystal display panels each displaying a video image corresponding to a respective one of the R, G, and B color components; an optical path which directs colored light from each of the light sources to a respective one of the liquid crystal display panels, outputs video image light modulated by the display panels and combines the video image light from the display panels; and a projection lens which projects the combined video image light onto a screen.

As it stands, there is much room to improve the details of such a projection display device. One of the improvements is to further enhance the quality of video images displayed on the screen. There is a strong demand for developing such a technique to increase the video image quality as soon as possible.

For example, Japanese Unexamined Patent Publication No. 7-222185 discloses a projection liquid crystal display device which makes it possible to adjust the color temperature of at least one of a plurality of light sources so that chromaticity can be adjusted and sufficiently bright images can be obtained. As a color temperature adjustment method, there is disclosed an example of providing a filter that lowers colored light within a given waveband. This makes it easy to increase the brightness and adjust the color temperature.

However, the display device disclosed is complex in structure because of the necessity of a special filter for color temperature adjustment as a separate part.

BRIEF SUMMARY OF THE INVENTION

According to an aspect of the present invention there is provided a projection display device comprising: a plurality of light sources configured to produce different primary colors of light; a plurality of display units each of which is configured to be driven by a video signal corresponding to one of the primary colors, receive light from one of the light sources which produces light corresponding to the one of the primary colors, and output video image light modulated by the video signal; a projection unit configured to project video image light output from the display units; and a light source control unit configured to control the amount of light produced by each of the light sources independently.

DETAILED DESCRIPTION OF THE INVENTION

Figure 1:
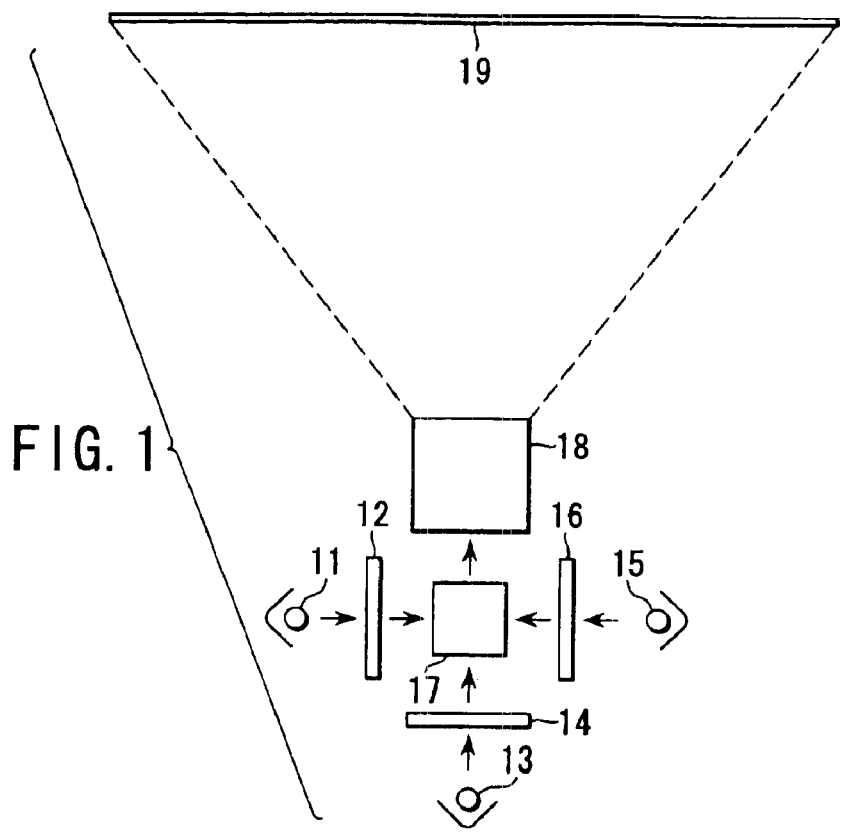
FIG. 1 shows an example of an optical system of a projection display device according to an embodiment of the present invention.

A projection display device according to an embodiment of the present invention will be described in detail below with reference to the accompanying drawings. FIG. 1 is a schematic diagram of the projection display device and mainly illustrates its optical system in particular. In FIG. 1, a light source 11 is adapted to emit red light. A liquid crystal (LC) display panel 12 is placed in front of the light source 11.

The liquid crystal display device 12 has a video display screen driven by a red component video signal. When illuminated with the red light from the light source 11, the liquid crystal display panel 12 outputs video image light modulated by the red component video signal.

Likewise, there is provided a light source 13 which corresponds to the green waveband component of light. A liquid crystal display panel 14 is placed in front of the light source 13. Further, a light source 15 is provided which corresponds to the blue waveband component of light. A liquid crystal display panel 16 is placed in front of the light source 15.

The liquid crystal display panels 14 and 16 are driven by green and blue component video signals, respectively. When illuminated with the green and blue light from the light sources 13 and 15, the liquid crystal display panels 14 and 16 respectively output video image light modulated by the green and blue component video signals.

The red, green and blue light components transmitted through the liquid crystal display panels 12, 14 and 16 are incident on a cross-prism 17 and combined. After that, the output light from the cross-prism 17 is diffusion-projected by a projection lens 18 onto a screen 19 for video image display.

Figure 2:
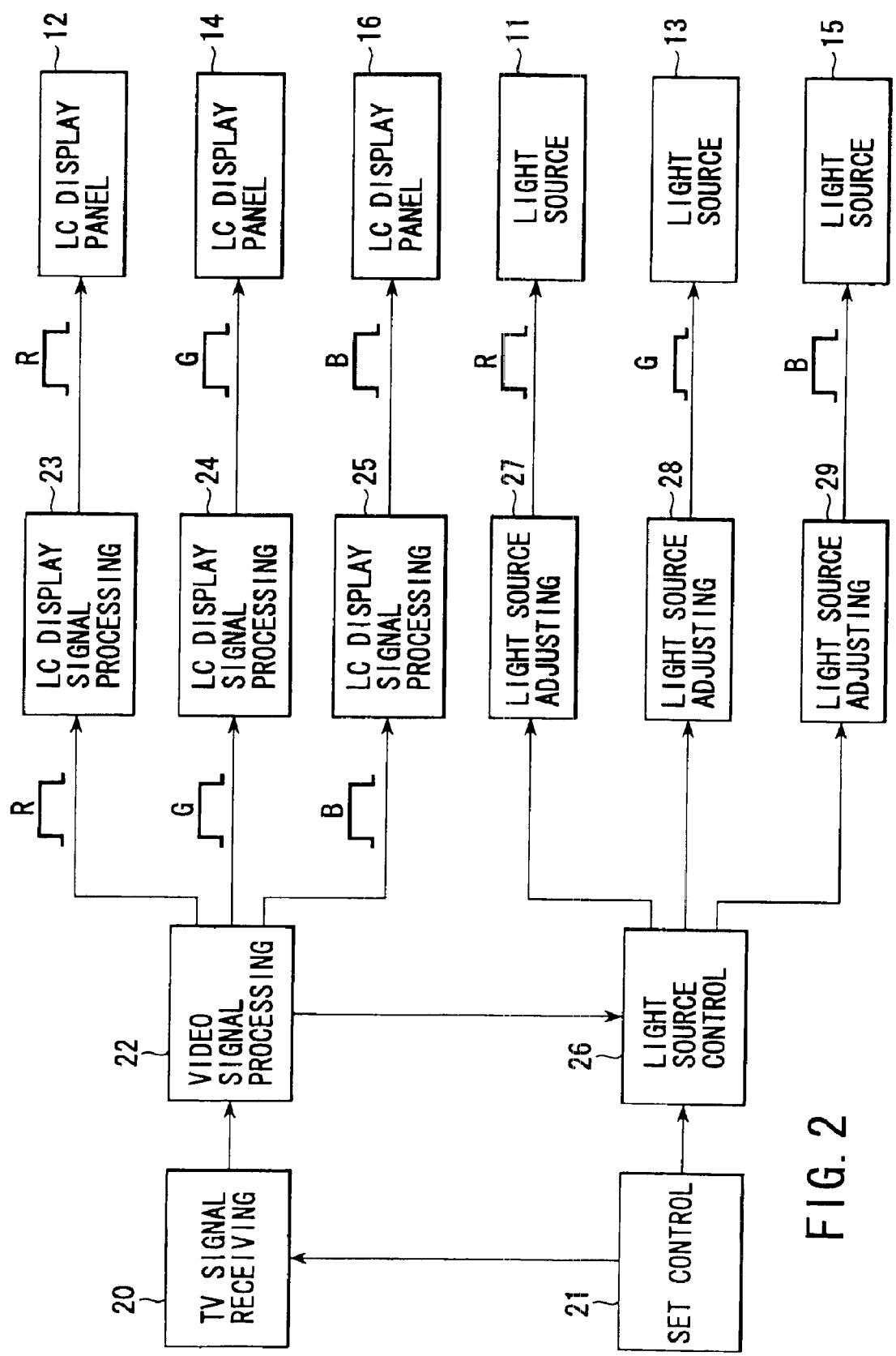
FIG. 2 is a block diagram of the signal processing system of the projection display device in the embodiment of the present invention.

FIG. 2 shows the signal processing system of the projection display device. A television signal receiving section 20 is controlled by a set controller 21 including a microcomputer to select a desired television (TV) signal from among a plurality of received television signals and output it to a video signal processing section 22.

The video signal processing section 22 performs demodulation processing on the input television signal to produce R, G, and B video signals, which in turn are applied to liquid crystal display signal processing sections 23, 24 and 25, respectively.

The liquid crystal display signal processing sections 23, 24 and 25 convert the input R, G and B video signals into liquid crystal display signals suitable for video display on succeeding liquid crystal display panels 12, 14, and 16. Thereby, video images corresponding to the R, G and B waveband components are displayed on the liquid crystal display panels 12, 14, and 16, respectively.

The video signal processing section 22 outputs to a light source controller 26 control signals for adjusting the amounts of light emitted by light sources 11, 13, and 15 to suit the video signals. The light source controller 26 is also supplied from the set controller 21 with setting data which conforms to a display mode.

Based on the input control signal and setting data, the light source controller 26 produces and outputs light source adjustment data to light source adjustment sections 27, 28 and 29 which drives the R, G and B light sources 11, 13, and 15, respectively. Based on the input light source adjustment data, each of the light source adjustment sections 27, 28 and 29 produces and applies a light adjustment signal to a corresponding respective one of the light sources 11, 13, and 15. Each of the light sources emits light accordingly.

Figure 3:
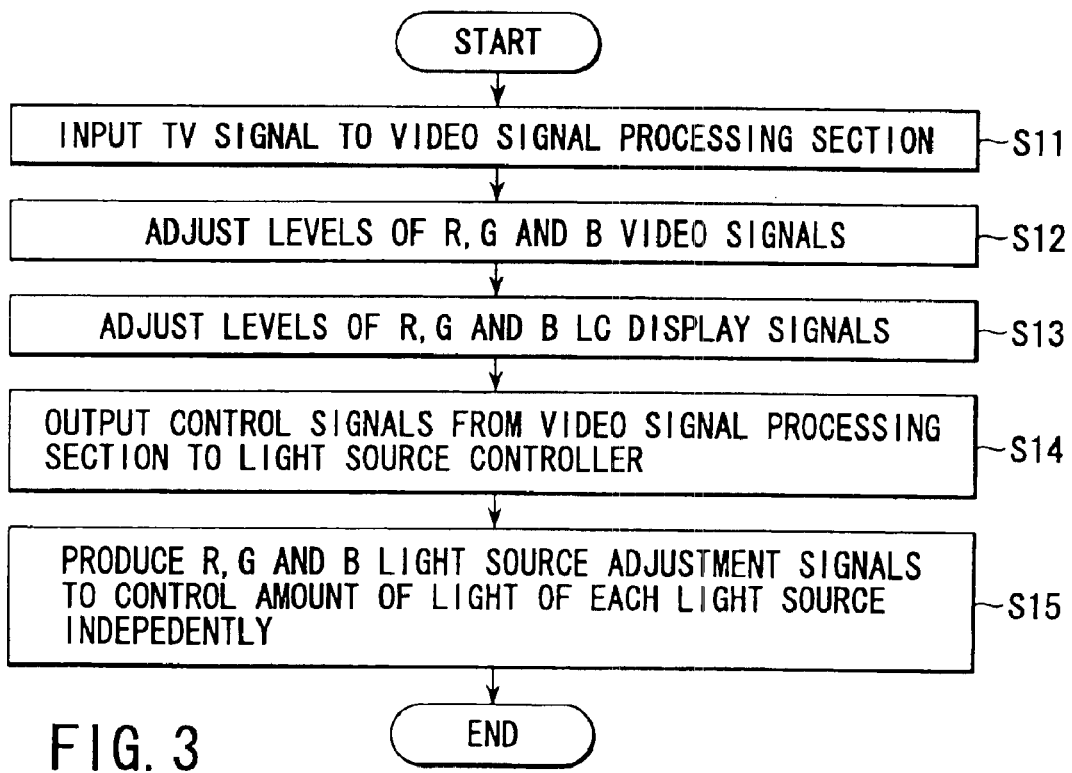
FIG. 3 is a flowchart illustrating a characteristic operation of the projection display device in the embodiment of the present invention.

FIG. 3 is a flowchart illustrating characteristic operations of the projection display device configured as described above. First, when the operation of the display device is started, a television signal selected by the television signal receiving section 20 is input to the video signal processing section 22.

Then, in step S12, the video signal processing section 22 recovers R, G and B video signals from the input television signal and adjusts the level of each of these video signals. In this example, the R, G and B video signals are controlled so that each of them is level-adjusted at a constant amplification factor.

The level-adjusted R, G and B video signals from the video signal processing section 22 are applied to the liquid crystal display signal processing sections 23, 24 and 25, respectively. Thereby, liquid crystal display signals to be displayed on the liquid crystal display panels 12, 14 and 16 are produced as described previously.

After that, in step S13, the liquid crystal display signal processing sections 23, 24 and 25 adjust to the levels of the R, G and B liquid crystal display signals, respectively. In this example, each of the R, G and B liquid crystal display signals is adjusted to have the same level as the video signals.

In subsequent step S14, the video signal processing section 22 outputs to the light source controller 26 control signals for adjusting the amounts of light produced by the light sources 11, 13 and 15. The light source controller 26 responds to the input control signals and setting data from the set controller 21 to produce R, G and B light source adjustment data, which are output to the light source adjustment sections 27, 28, and 29.

In step S15, the light source adjustment sections 27, 28 and 29 respond to the input light source adjustment data to produce R, G and B light source adjustment signals, which are output to the light sources 11, 13 and 15, respectively. It therefore becomes possible to vary the amount of light produced by each of the light sources 11, 13 and 15 individually.

In this example, as shown in FIG. 2, the G light source adjustment signal is controlled so that its level becomes lower than those of the R and B light source adjustment signals. This means that the amount of light emitted by the light source 13 has been set lower than those of the other light sources 11 and 15, in other words, the G luminance level has been set lower than the R and B luminance levels.

Thereby, the luminance levels can be adjusted according to the characteristics of the liquid crystals in the liquid crystal panels 12, 14, and 16, allowing the R, G and video components to be displayed uniformly.

That is to say, the light source controller 26 and the light source adjustment sections 27, 28, and 29 form a control unit which controls the amount of light of each of the light sources 11, 13, and 15 individually.

According to the embodiment described above, the R, G and B luminance levels can be controlled not only by adjusting the levels of the liquid crystal display signals for the R, G, and B liquid crystal display panels 12, 14 and 16 but also by varying the amount of light produced by each of the R, G and B light sources 11, 13, and 15 individually.

Thus, by combining two types of luminance adjustment means to make the R, G and B luminance levels adjustable, it becomes possible to achieve luminance control of displayed video images which has not existed heretofore. Thereby, it becomes possible to improve the quality of video images displayed on the screen 19 readily with a straightforward configuration.

In addition, white balance adjustment and luminance adjustment can be made by making the amount of light of each of the light sources 11, 13 and 15 corresponding to the R, G and B waveband components variable independently.

Furthermore, the amounts of light of the R, G and B light sources 11, 13 and 15 can be adjusted dynamically to suit a video signal to be displayed. For example, for a dark video image, the amounts of light of the light sources can be lowered correspondingly to display that video image more darkly.

Moreover, it is also possible to make luminance adjustment to suit a preset video image display mode. That is, in a theater mode, making, say, blue and/or red color brighter allows a video image displayed on the screen 19 to become close to a video image as viewed in a movie theater; therefore, desired color reproduction becomes enabled by controlling the amount of light of a specific light source or sources according to a display mode.

Furthermore, the luminance control based on control of the amounts of light of the light sources 11, 13 and 15 allows the effective use of the dynamic range of a video signal. In addition, control of the amounts of light of the light sources 11, 13 and 15 allows the power consumption to be reduced in comparison with the circumstance that each light source is driven to produce the maximum amount of light as hitherto.

Figure 4:
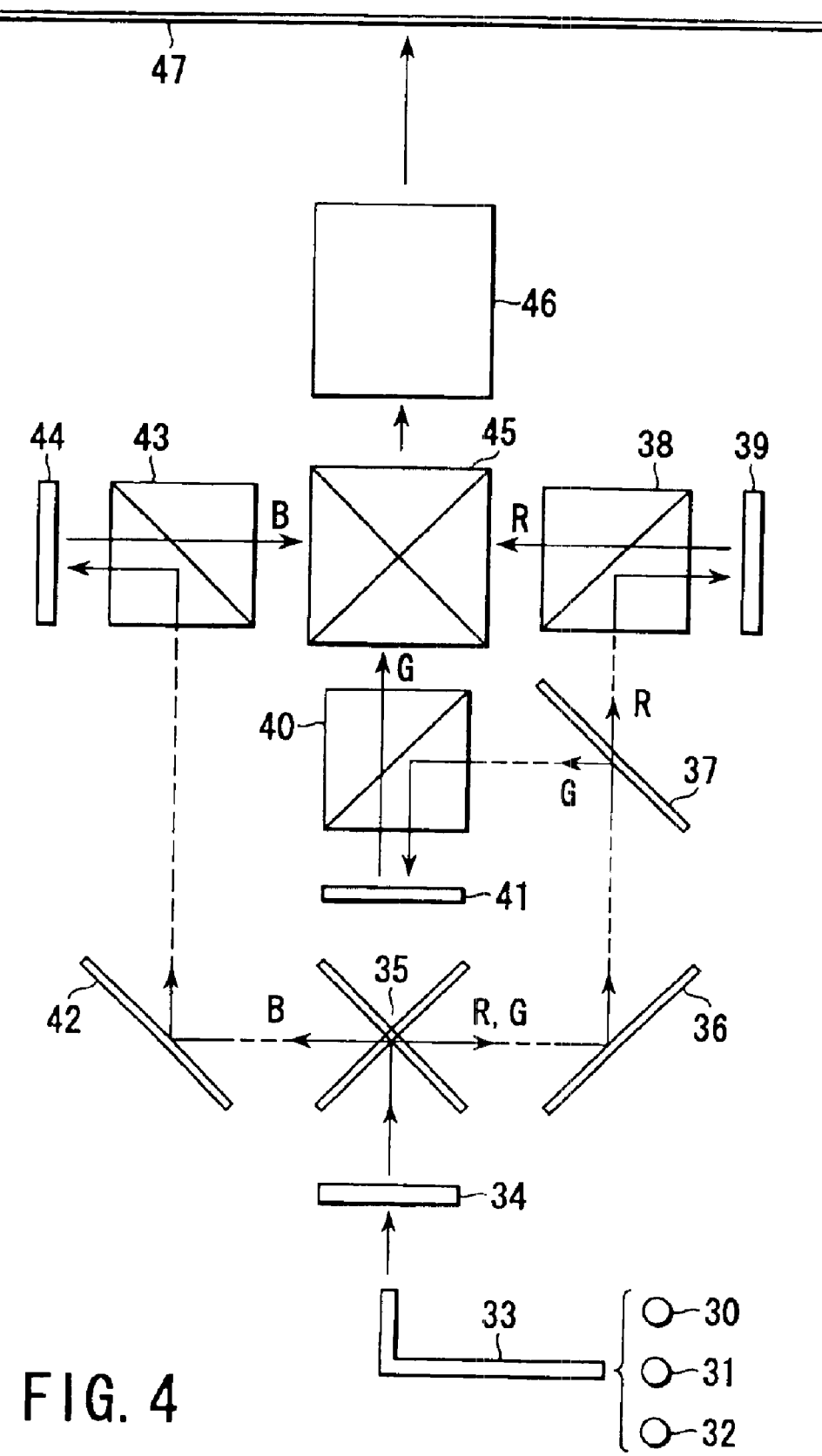
FIG. 4 shows another example of an optical system of the projection display device in the embodiment of the present invention.

Referring now to FIG. 4 there is illustrated another example of an optical system of a projection display device. Though FIG. 4 mainly illustrates the optical system, the signal processing system remains unchanged from that of FIG. 2.

In the optical system of FIG. 4, laser sources 30, 31 and 32 are provided which correspond to R, G and B waveband components, respectively. Beams of light produced by the laser sources 30, 31 and 32 are transmitted through an optical fiber cable 33. The output light of the optical fiber cable 33 passes through a condenser lens 34 and is then separated by a cross-dichroic mirror 35 into the R and G components and the B component.

The R and G components of light are reflected by a mirror 36 onto a dichroic mirror 37, which separates the incident light into the R and G components. The R light is directed through a beam splitter 38 onto a liquid crystal display panel 39 to display a video image corresponding to the R component. The G light is directed through a beam splitter 40 onto a liquid crystal display panel 41 to display a video image corresponding to the G component.

On the other hand, the B component of light separated by the cross-dichroic mirror 35 is reflected by a mirror 42 and then directed through a beam splitter 43 onto a liquid crystal display panel 44, whereby a video image corresponding to the B component is displayed.

The liquid crystal display panels 39, 41 and 44 modulate the incident light with R, G and B video signals and reflect the modulated light onto the beam splitters 38, 40 and 43. The R, G and B video image light components from the liquid crystal display panels 39, 41 and 44 are directed through the beam splitters 38, 40 and 43 to a cross-prism 45 where they are combined.

After that, the R, G and B video image light components combined in the cross prism 45 are directed onto a projection lens 46 and then diffusion-projected onto a screen 47.

Even with the projection display device equipped with such an optical system, by controlling the amount of light of each of the R, G and B light sources 30, 31 and 32 independently, the R, G and B luminance levels can be controlled as in the case of the previously described optical system.

The present invention is not limited to the above embodiment and may be practiced or embodied in still other ways without departing from the scope and spirit thereof.

What is claimed is:

1. A projection display device, comprising:
   first, second, and third light sources configured to produce red, green and blue primary colors of light;
   first, second, and third liquid crystal display panels each of which is configured to be driven by a video signal corresponding to one of the primary colors, receive light from one of the first, second and third light sources, and output video image light modulated by the video signal;
   a projection unit configured to combine the video image lights output from the first, second, and third liquid crystal display panels and diffusion-project it on the screen; and
   control unit configured to control the amount of light produced by each of the first, second, and third light sources independently based on a video signal to be displayed on a corresponding one of the first, second and third liquid crystal display panels, so that the luminance level of video image light transmitted through each of the liquid crystal panels is adjusted.

2. A projection display device according to claim 1, wherein each of the first, second, and third liquid crystal display panels is of a transmissive type which allows transmission and output of video image light modulated by the video image signal.

3. A projection display device according to claim 1, wherein the projection unit includes a cross prism configured to combine video images output from the display units and a projection lens configured to diffusion-project video images combined by the cross prism onto a screen.

4. A projection display device according to claim 1, wherein the control unit controls the amount of light produced by each of the light sources independently on the basis of a video signal to be displayed on a corresponding one of the display units.

5. A projection display device according to claim 1, wherein the control unit controls the amount of light produced by each of the light sources independently so as to adjust the luminance of a video image diffusion-projected by the projection unit.

6. A projection display device according to claim 1, wherein the control unit controls the amount of light produced by each of the light sources independently so as to adjust the white balance of a video image diffusion-projected by the projection unit.

7. A projection display device according to claim 1, wherein the control unit controls the amount of light produced by each of the light sources independently so as to adjust the luminance of a video image diffusion-projected by the projection unit in accordance with a preset video display mode.

8. A projection display device according to claim 1, wherein the light sources include an optical fiber cable which conducts the different colors of light produced by the light sources to the display units.

* * * * *